United States Patent [19]

Takahashi et al.

[11] Patent Number: 5,294,373
[45] Date of Patent: Mar. 15, 1994

[54] CONDUCTIVE SILICONE RUBBER COMPOSITION AND CONDUCTIVE SILICONE RUBBER

[75] Inventors: Masaharu Takahashi; Tomiyoshi Tsuchida; Tsutomu Nakamura, all of Annaka, Japan

[73] Assignee: Shin-Etsu Chemical Co., Ltd., Tokyo, Japan

[21] Appl. No.: 812,285

[22] Filed: Dec. 23, 1991

[30] Foreign Application Priority Data

Dec. 28, 1990 [JP] Japan ................. 2-416974
Dec. 28, 1990 [JP] Japan ................. 2-416975

[51] Int. Cl.$^5$ ............... H01B 1/00; H01B 1/20; H01B 1/24
[52] U.S. Cl. ................... 252/502; 252/510; 252/511; 528/10; 528/12; 528/34; 525/474
[58] Field of Search ........ 252/502, 510, 511; 528/10, 12, 34; 525/474

[56] References Cited

U.S. PATENT DOCUMENTS

| | | | |
|---|---|---|---|
| 4,273,697 | 6/1981 | Sumimura et al. | 252/511 |
| 4,728,687 | 3/1988 | Watanabe et al. | 524/493 |
| 4,980,384 | 12/1990 | Takahashi et al. | 521/91 |
| 5,053,167 | 10/1991 | Kawaguchi | 252/511 |
| 5,082,596 | 1/1992 | Fukuda et al. | 252/511 |

FOREIGN PATENT DOCUMENTS 2-124977 5/1990 Japan .

OTHER PUBLICATIONS

Patent Abstracts of Japan, vol. 13, No. 205 (C-595) Jan. 25, 1989.
Patent Abstracts of Japan, vol. 14, No. 342 (C-743) May 14, 1990.

Primary Examiner—Linda Skaling
Assistant Examiner—M. Kopec
Attorney, Agent, or Firm—Birch, Stewart, Kolasch & Birch

[57] ABSTRACT

A conductive silicone rubber composition comprises a conductive silicone rubber composition comprising:
(a) an organopolysiloxane of the following general formula (1):

$$R^1_a SiO_{\frac{4-a}{2}} \quad (1)$$

wherein $R^1$ is an unsubstituted or substituted monovalent hydrocarbon group having 1 to 10 carbon atoms and "a" is a positive number of 1.90 to 2.05,
(b) conductive carbon black, and
(c) an organic peroxide of the following general formula (2):

$$R^2-OO-\underset{\underset{O}{\|}}{C}-O-X-O-\underset{\underset{O}{\|}}{C}-OO-R^3 \quad (2)$$

wherein X is $-(CH_2)_n-$ in which "n" is an integer of 2 to 8 or $$-CH_2-\underset{\underset{CH_3}{|}}{\overset{\overset{CH_3}{|}}{C}}-CH_2-,$$

and $R^2$ and $R^3$ are independently selected from monovalent hydrocarbon groups having 3 to 10 carbon atoms and $-SiR^4_3$ in which $R^4$ is a methyl, ethyl or phenyl group.

2 Claims, No Drawings

CONDUCTIVE SILICONE RUBBER COMPOSITION AND CONDUCTIVE SILICONE RUBBER

DETAILED DESCRIPTION OF THE INVENTION

1. Field of the Invention

The present invention relates to non-foamable or foamable conductive silicone rubber compositions containing conductive carbon black which can be cured through the normal-pressure hot-air vulcanization (HAV) method and non-foamed or foamed conductive silicone rubbers obtained by curing the composition.

2. Prior Art

Various types of conductive rubbers obtained by curing a rubber composition having a conductive material blended therein are conventionally known. For example, conductive rubbers with the electrical resistivity of $10^5$ to 10 $\Omega\cdot cm$ are widely used in which carbon black is blended as a conductive material.

Silicone rubber which is one of electrically insulating rubbers is popular because it is superior in heat resistance, cold resistance, and weather resistance. Conductive silicone rubber having a conductive material such as carbon black blended therein is also practically used similarly to other conductive rubbers. Moreover, conductive silicone foam rubber is also known which is prepared by adding a foaming agent to a conductive silicone rubber composition to foam and cure it.

As the conductive material to be added to the conductive silicone rubber, carbon black, graphite, various metal powders including silver, nickel and copper powders, various fine particles and short fibers to which electrical conductivity is given by surface treating them with metal such as silver, and mixture of carbon and metallic fibers are practically used because they decrease the volume resistivity of silicone rubber up to $10^{10}$ to $10^{-3}$ $\Omega\cdot cm$ according to the type of the conductive materials and their filling amount without impairing the characteristic peculiar to the silicone rubber. To obtain high-conductive silicone rubber with the volume resistivity of $10^5$ $\Omega\cdot cm$ or less, carbon black and metal powders of silver and nickel are suitably used. Especially, carbon black powder is preferred in view of the cost.

However, in case of continuously molding and vulcanizing long products such as seals, gaskets and rollers through extrusion molding of a Conductive silicone rubber composition containing carbon black such as acetylene black, the vulcanizing system is extremely restricted due to the presence of carbon black.

For organic peroxide vulcanization, for example, if an acyl-based peroxide such as benzoyl peroxide and 2,4-dichlorobenzoyl peroxide used for normal-pressure hot-air vulcanization (HAV) of silicone rubber composition is used for vulcanizing a conductive siliconee rubber composition containing carbon black, the vulcanization is inadequately executed due to the influence of carbon black, resulting in no satisfactory molded products. When an alkyl-based peroxide such as dicumyl peroxide and ditertiarybutyl peroxide is used for the system containing carbon black, compression molding may be possible. However, extrusion normal-pressure hot-air vulcanization is not carried out well because the surface of an article to be cured is not fully vulcanized due to the influence of oxygen in the air. Therefore, satisfactory products also cannot be obtained.

To execute extrusion normal-pressure hot-air vulcanization of a silicone rubber composition containing carbon black, an addition vulcanization method is conventionally employed. In the method, an organopolysiloxane having alkenyl groups and an organohydrogenpolysiloxane having silicone-bonded hydrogen atoms are addition reacted and cured in the presence of a curing catalyst such as a platinum compound.

However, the addition reaction method has disadvantages that since the shelf life (preservation period) of the composition is limited and pot life is too short, workability is inferior and curing is injured by catalyst poisons such as amine, sulfur and tin.

Especially for manufacturing electromagnetic-wave-shielding and architectural gaskets, office-use conductive rollers such as charging, transfer, developing, paper-feed, and fixing rollers, and conductive calendering moldings such as zebra connector moldings from conductive silicone rubbers, the molding method according to the conventional normal-pressure hot-air vulcanization has the problem in moldability and quality of the resulting rubbers. Therefore, it is strongly desired to solve the above problems.

To obtain satisfactory conductive silicone foam rubber, it is necessary to progress the vulcanization to a certain extent by addition vulcanization in order to confine the foaming gas produced due to the decomposition of foaming agent in the system. Therefore, it is required to find a proper control agent for controlling the addition reaction. However, even if a proper control agent is found, the optimum pot life for obtaining satisfactory foam is extremely limited. Accordingly, it is actually difficult to continuously manufacture conductive silicone foam rubbers according the addition reaction method through the normal-pressure hot-air vulcanization.

Thus, it is also desired to develop a foamable conductive silicone rubber composition having a long pot life in which persons engaged in foam (sponge) molding can stand and allowing quick vulcanization.

SUMMARY OF THE INVENTION

Therefore, it is an object of the present invention to provide non-foamable or foamable conductive silicone rubber compositions having conductive carbon black blended therein which are superior in the preservation stability, can be vulcanized well through normal-pressure hot-air vulcanization in extrusion and calendaring molding, has superior moldability, and can give non-foamed or foamed conductive silicone rubbers having excellent physical properties and conductivity. It is another object to provide non-foamed or foamed conductive silicone rubbers obtained from the above compositions.

The inventors have found a conductive silicone rubber composition comprising an organopolysiloxane of the following general formula (1):

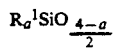
(1)

wherein $R^1$ represents an unsubstituted or substituted monovalent hydrocarbon group having 1 to 10 carbon atoms and "a" is a positive number of 1.90 to 2.05, conductive carbon black and an organic peroxide of the following general formula (2):

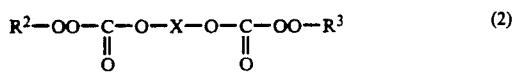  (2)

wherein X is $-(CH_2)_n-$ in which "n" is an integer of 2 to 8 or

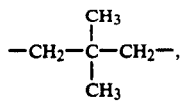

and $R^2$ and $R^3$ are independently selected from monovalent hydrocarbon groups having 3 to 10 carbon atoms and $-SiR_3^4$ in which $R^4$ is a methyl, ethyl or phenyl group.

The conductive silicone rubber composition comprising the above components can be vulcanized well through normal-pressure hot-air vulcanization (HAV) or ultrahigh frequency (UHF) vulcanization for extrusion molding or calendering molding because the organic peroxide of formula (2) is not influenced by carbon black in spite that the composition contains carbon black. The moldability is superior because it does not depend on addition vulcanization. The resulting cured rubber has satisfactory conductivity and is free form surface tack.

The inventors have also found that a foamable conductive silicone rubber composition obtained by blending a foaming agent to the above composition comprising the organopolysiloxane of formula (1), conductive carbon black, and the organic peroxide of formula (2) is very stable and easy to use because it has a preservation stability of 7 days or more and a long pot life. The foamable conductive silicone rubber composition can be quickly vulcanized, foamed and cured through normal-pressure hot-air vulcanization and ultrahigh frequency vulcanization for extrusion molding and calendering molding. The resulting foam rubber satisfactory conductivity, and is free from surface tack.

In Japanese Patent Application Laid-Open No. 130663/1988 and Japanese Patent Application No. 278381/1988, the inventors proposed the organic peroxide of formula (2) for normal-pressure hot-air vulcanization of a siliconee rubber composition containing no carbon black. Unexpectedly, we have found that the organic peroxide of formula (2) can also allow the siliconee rubber composition containing carbon black to effectively execute normal-pressure hot-air vulcanization and allow the composition to vulcanize quickly by heating while the composition is very stable at ordinary temperature.

Therefore, the present invention provides a non-foamable conductive silicone rubber composition comprising (a) the organopolysiloxane of formula (1), (b) conductive carbon black, and (c) the organic peroxide of formula (2). The present invention also provides a foamable conductive silicone rubber composition comprising the above components (a) to (c) and further (d) a foaming agent. The conductive silicone rubbers obtained by curing the compositions are also provided.

DETAILED DESCRIPTION OF THE INVENTION

The component (a) according to the composition of the present invention is an organopolysiloxane represented by the following general formula (1).

  (1)

In the above formula, $R^1$ is identical or different and an unsubstituted or substituted monovalent hydrocarbon group having 1 to 10 carbon atoms, preferably 1 to 8 carbon atoms. Examples of $R^1$ include an alkyl group such as methyl, ethyl, propyl and butyl groups, an alkenyl group such as vinyl, allyl and butaniel groups, an aryl group such as phenyl and tolyl groups, and substituted ones of those groups in which some or all of hydrogen atoms bonded to carbon atoms are replaced by a halogen atom, cyano group and the like such as chloromethyl, chloropropyl, 3,3,3- trifluoropropyl and 2-cyanoethyl groups. In the formula, "a" is a positive number of 1.90 to 2.05. The organopolysiloxane preferably has a straight-chain molecular structure, although it may have a partially branched chain. The organopolysiloxane is terminated with a triorganosilyl or hydroxyl group. Examples of the triorganosilyl group include trimethylsilyl, dimethylvinylsilyl, methylphenylvinylsilyl, methyldiphenylsilyl, methyldivinylsilyl, and trivinylsilyl groups. In this case, to effectively decrease the surface tack of an article to be manufactured, it is preferred that the both ends of the molecular chain consist of a multifunctional silyl group such as $(CH_2=CH)_2RSi-$ and $(CH_2=CH)_3Si-$ wherein R represents the same meaning as $R^1$. The organopolysiloxane is not restricted in the polymerization degree and it is preferable that the organopolysiloxane has the viscosity of 300 cs or more at 25° C.

The conductive carbon black of the component (b) may be one used for ordinary conductive rubber compositions. For example, acetylene black, conductive furnace black (CF), superconductive furnace black (SCF), extraconductive furnace black (XCF), conductive channel black (CC), and furnace black and channel black each heat treated at a high temperature of about 1,500° C. can be used.

Examples of acetylene black include DENKA acetylene black (manufactured by DENKIKAGAKU Co., Ltd.) and SHAUNIGAN acetylene black (manufactured by SHAUNIGAN CHEMICAL Co., Ltd.). Examples of conductive furnace black include CONTINEX CF (manufactured by CONTINENTAL CARBON Co., Ltd.) and VULCAN C (manufactured by CABOT Co., Ltd.). Examples of superconductive furnace black include CONTINEX SCF (manufactured by CONTINENTAL CARBON Co., Ltd.) and VULCAN SC (manufactured by CABOT Co., Ltd.). Examples of extraconductive furnace black include ASAHI HS-500 (manufactured by ASAHI CARBON Co., ltd.) and VULCAN XC-72 (manufactured by CABOT Co., Ltd.). Examples of conductive channel black include COURAX L (manufactured by DEGUSSA Co., Ltd.). As a kind of furnace black, KETCHEN BLACK EC and EC-600JD (manufactured by KETCHEN BLACK INTERNATIONAL Co., Ltd.) can be used. Among the above carbon blacks, acetylene black is superior in conductivity because it contains less impurities and has an advanced secondary structure. Therefore, acetylene black is preferred for the present invention. KETCHEN BLACK EC and KETCHEN BLACK EC-600JD are also preferred because they have an excellent specific surface area and show excellent conductivity even if they are slightly used.

The conductive carbon black is preferably blended in an amount of 5 to 100 parts by weight, particularly 10 to 70 parts by weight per 100 parts by weight of the organopolysiloxane (a). Less than 5 parts by weight of the conductive carbon black may results in an inferior conductivity. More than 100 parts by weight of the conductive carbon black may results in an inferior mechanical strength of cured products.

The organic peroxide represented by the following formula (2) is used for the component (c) of the composition of the present invention.

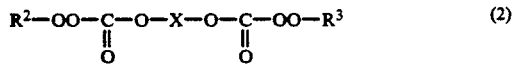

In the above formula, X is $-(CH_2)_n-$ (where n is an integer of 2 to 8) or $-CH_2-C(CH_3)_2-CH_2$, $R^2$ and $R^3$ are identical or different and independently selected from unsubstituted and substituted monovalent hydrocarbon groups having 3 to 10 carbon atoms and $-SiR_3^4$ (wherein $R^4$ is methyl, ethyl, or phenyl group). Examples of the monovalent hydrocarbon group include n-propyl, isopropyl, t-butyl, n-butyl, n-amyl, t-amyl, hexyl, heptyl, octyl, 2-ethylpropyl, 2-ethylbutyl, 2-ethylhexyl and cumyl groups. Examples of $-(SiR^4)_3$ include trimethylsilyl, triethylsilyl and triphenylsilyl groups.

The organic peroxide of component (c) acts as the vulcanizing agent for the organopolysiloxane of component (a). It is preferable to blend 0.1 to 5 parts by weight, more preferably 0.5 to 3 parts by weight of the organic peroxide per 100 parts by weight of the organopolysiloxane (a). Less than 0.1 part by weight may result in insufficient vulcanization. More than 5 parts by weight may result in an adverse effect by an excess residue of the decomposed peroxide and a high cost.

A foaming agent is blended as component (d) to the composition of the present invention in order to obtain a foamed product. Any foaming agent can be used as long as it is stable at room temperature and emits a foaming gas when it is exposed to a high temperature. Nitrogen gas is preferred as the foaming gas. Carbon dioxide gas or other gas is also preferred. The foaming agent may be commercially available ones. As the foaming agent, those having a decomposition temperature of 80° to 300° C. are preferably used including azoisobutyronitrile, dinitropentamethylenediamine, benzene sulfonyl hydroxide, N,N'-dinitrosoN,N'-dimethyltelephthalamide, and azodicarbonamide. It is preferable to blend 1 to 10 parts by weight, more preferably 3 to 7 parts by weight of the foaming agent per 100 parts by weight of the organopolysiloxane (a).

It is effective to blend the conductive silicone rubber composition of the present invention with an organic silicone compound having at least one $\equiv SiH$ group in one molecule as component (e) in addition to the above components in order to reduce the surface tackiness of a product obtained through normal-pressure hot-air vulcanization of the composition of the present invention.

Straight-chain or cyclic organic silicone compound is preferably used as the organic silicone compound (e), although organic silicone compound having a partially branched structure or three-dimensional structure can also be used. Examples of the organic silicone compound include methylhydrogenpolysiloxanes having various polymerization degrees in which the both ends are blocked with trialkylsilyl groups, organopentasiloxane shown as $Si[OSi(CH_3)_2H]_4$, siloxane copolymers consisting of $SiO_2$ unit and $(CH_3)_2HSiO_{0.5}$ unit, copolymers of methylhydrogenpolysiloxane and dialkylsiloxane, polysilylalkylenesiloxanes containing $\equiv SiH$ bonds, polysilanes, and polycarbosilanes.

It is preferable to blend 0 to 10 parts by weight, more preferably 0.05 to 10 parts by weight, most preferably 0.5 to 5 parts by weight of the organic silicone compound of component (e) per 100 parts by weight of the organopolysiloxane (a). When less than 0.05 parts by weight of the silicone compound is blended, its blending effect may not appear. When the blending amount of the silicone compound exceeds 10 parts by weight, the property of cured products such as heat resistance may be degraded.

The composition of the present invention can be obtained by uniformly blending the predetermined amount of the above-mentioned components. The sequence for blending these components is not limited. In general, the organopolysiloxane of component (a) is blended with the conductive carbon black of component (b), and then blended with the organic silicone compound of component (e) (if needed), the organic peroxide of component (c), and, if a foamable composition is required, the foaming agent of component (d). Then, the mixture is conditioned through kneading by a Banbury mixer or roller.

It is possible to blend the composition of the present invention with a dispersing agent such as a low molecular weight siloxane having a polymerization degree of 100 or less, silanol group-containing silane and alkoxy group-containing silane, a heat-resistance improving agent such as iron oxide, selenium oxide and iron octoate, and a pigment. In view of reinforcement, silica fine powders such as fumed silica, wet silica, hydrophobically surface treated fumed silica and wet silica, quartz and diatomaceous earth may be blended. Moreover, it is also possible to add a saturated aliphatic hydrocarbon such as isoparafin solvent in order to effectively give workability and moldability to the composition. The other additives used for conventional silicone rubber compositions can also be blended.

The conductive silicone rubber composition thus obtained is preferably vulcanized through normal-pressure hot-air vulcanization and converted into an elastic body. In this case, the vulcanization is preferably carried out for 5 to 10 seconds at 200° to 500° C. It is also effective to adopt the heating method by an infrared heater in combination with hot air. The normal-pressure hot-air vulcanization method may be combined with UHF heating because the composition is superior in the high-frequency absorbing characteristic since it is blended with carbon black.

The thus molded elastic body or the cured product of the conductive silicone rubber composition according to the present invention is a conductive silicone rubber free from void and surface tackiness and superior in heat resistance. Therefore, the conductive silicone rubber of the present invention can preferably be used as EMI-shielding and architectural gaskets, and conductive rollers such as charging, transfer, developing, paper-feed, and fixing rollers.

The conductive silicone foam rubber prepared by foaming the composition with a foaming agent is also free from void and surface tackiness and superior in heat resistance. Therefore, the conductive silicone foam rubber of the present invention can also preferably be used as EMI-shielding materials, architectural gaskets, semiconductive sponge rollers having a resistivity of $10^3$ to $10^{10}$ Ω-cm such as charging, transfer, developing, paper-feed, fixing and pressure rollers, and sponge sheets such as antistatic mats.

Examples and Comparative Examples are shown below for illustration but not for limitation. In the following, viscosity is the value measured at 25° C.

EXAMPLES 1 to 3 and COMPARATIVE EXAMPLES 1 and 2

Silicone rubber compositions were manufactured by kneading 100 parts by weight of an organopolysiloxane consisting of 99.7 mol % of dimethylsiloxane unit, 0.275 mol % of the methylvinylsiloxane unit and 0.025 mol % of dimethylvinylsilyl group with which the both ends of the molecular chain are blocked and having a viscosity of $1 \times 10^7$ cs, 40 parts by weight of acetylene black and 1 part by weight of selenium oxide using a pressure kneader, and then adding to 100 parts by weight of the thus obtained base compound a peroxide shown in Table 1 and a methylhydrogenpolysiloxane containing 1.6 mol per 100 g of ≡SiH bond and end-blocked with trimethylsilyl group.

Then, the compositions were extruded in the form of a 5 mm-diameter rod by an extruder having a diameter of 40 Mm, and passed through a normal-pressure hot-air vulcanization tower having a height of about 1 m with a temperature of 250° C. to conduct normal-pressure hot-air vulcanization for 5 minutes.

To the resulting non-foamed conductive silicone rubbers, their surface tackiness, hardness (JIS A), and volume resistivity were measured. The results are shown in Table 1.

TABLE 1

|  |  | Example | | | Comparative Example | |
|---|---|---|---|---|---|---|
|  |  | 1 | 2 | 3 | 1 | 2 |
| Base compound (parts by weight) |  | 100 | 100 | 100 | 100 | 100 |
| Organic peroxide (parts by weight) | A | 1.5 |  | 1.5 |  |  |
|  | B |  | 1.5 |  |  |  |
|  | C |  |  |  | 0.5 |  |
|  | D |  |  |  |  | 1.0 |
| Methylhydrogen-polysiloxane (parts by weight) |  |  |  | 0.5 |  |  |
| Properties | Surface tackiness | None | None | None (Very good) | Not vulcanized | Sticky |
|  | Hardness (JIS A) | 60 | 61 | 63 | — | 43 |
|  | Volume resistivity (Ω · cm) | 5.7 | 5.8 | 5.5 | — | — |

TABLE 1-continued

Organic peroxide

A: $H_3C-\underset{\underset{CH_3}{|}}{\overset{\overset{CH_3}{|}}{C}}-OO-\underset{\underset{O}{\|}}{C}-O-(CH_2)_6-O-\underset{\underset{O}{\|}}{C}-OO-\underset{\underset{CH_3}{|}}{\overset{\overset{CH_3}{|}}{C}}-CH_3$ B: $H_3C-\underset{\underset{CH_3}{|}}{\overset{\overset{CH_3}{|}}{C}}-OO-\underset{\underset{O}{\|}}{C}-O-CH_2-\underset{\underset{CH_3}{|}}{\overset{\overset{CH_3}{|}}{C}}-CH_2-O-\underset{\underset{O}{\|}}{C}-OO-\underset{\underset{CH_3}{|}}{\overset{\overset{CH_3}{|}}{C}}-CH_3$ C: 2,4-dichlorobenzoylperoxide
D: dicumyl peroxide From the results in Table 1, it is recognized that the compositions having the peroxide according to the present invention blended therein are sufficiently vulcanized in spite that they are blended with carbon black and give silicone rubbers having a low volume resistivity and free from surface tack. On the other hand, the compositions of Comparative Examples using the conventional peroxide are not vulcanized well due to the influence of carbon black.

EXAMPLES 4 to 6 and COMPARATIVE EXAMPLES 3 and 4

Foamable silicone rubber compositions were manufactured by kneading 100 parts by weight of an organopolysiloxane consisting of 99.7 mol % of dimethylsiloxane unit, 0.275 mol % of the methylvinylsiloxane unit and 0.025 mol % of dimethylvinylsilyl group with which the both ends of the molecular chain are blocked and having a viscosity of $1 \times 10^7$ cs, 40 parts by weight of acetylene black and 1 part by weight of selenium oxide using a pressure kneader, and then adding to 100 parts by weight of the thus obtained base compound a peroxide shown in Table 1 and a methylhydrogenpolysiloxane containing 1.6 mol per 100 g of ≡SiH bond and end-blocked with trimethylsilyl group, as well as azobisisobutyronitrile as a foaming agent.

Then, the compositions were extruded in the form of a 5 mm-diameter rod by an extruder having a diameter of 40 Mm, and passed through a normal-pressure hot-air vulcanization tower having a length of about 3 m with a temperature of 250° C. to conduct normal-pressure hot-air vulcanization for about 5 minutes.

To the obtained conductive silicone foam rubbers, surface tackiness, foaming magnification, and hardness (Ascar C) were measured.

The results are shown in Table 2.

TABLE 2

|  | Example | | | Comparative Example | |
|---|---|---|---|---|---|
|  | 4 | 5 | 6 | 3 | 4 |
| Base compound (parts by weight) | 100 | 100 | 100 | 100 | 100 |
| Organic peroxide (parts by weight) |  |  |  |  |  |
| A* | 1.5 |  | 1.5 |  |  |
| B* |  | 1.5 |  |  |  |
| C* |  |  |  | 0.75 |  |
| D* |  |  |  |  | 1.0 |
| Methylhydrogen-polysiloxane (parts by weight) |  |  | 0.5 |  |  |
| Azobisisobutyronitrile (parts by weight) | 5 | 5 | 5 | 5 | 5 |

TABLE 2-continued

| | Example | | | Comparative Example | |
|---|---|---|---|---|---|
| | 4 | 5 | 6 | 3 | 4 |
| Properties | | | | | |
| Surface tackiness | None | None | None (Very good) | Not vulcanized | Sticky |
| Hardness (JIS A) | 3.0 | 2.7 | 3.2 | — | 1.5 |
| Volume resistivity ($\Omega \cdot cm$) | 20 | 23 | 15 | — | 30 |

*The same peroxides as shown above

From the results in Table 2, it is recognized that the compositions having the peroxide according to the present invention blended therein are sufficiently vulcanized and give silicone foam rubber free from surface tack in spite that they are blended with carbon black. On the other hand, the compositions of Comparative Examples using the conventional peroxide are not vulcanized well due to the influence of carbon black.

EXAMPLE 7 and COMPARATIVE EXAMPLE 5

The foamable silicone rubber composition according to the present invention was prepared by blending the organic peroxide A and azobisisobutyronitrile to the base compound of Example 4. For comparison, an addition reaction type silicone rubber composition having the formulation shown in Table 3 was prepared. The compositions were extruded, foamed and vulcanized in the same manner as in Examples 4 to 6 to examine their pot life. The results are shown in Table 3.

TABLE 3

| | Example 7 | Comparative Example 5 |
|---|---|---|
| Base compound | 100 pbw | 100 pbw |
| Organic peroxide A | 1.5 | |
| Platinum compound* | | 0.01 |
| Acetylene alcohol | | 0.1 |
| Cross-linking agent** | | 1.6 |
| Foaming agent*** | 7 | 7 |
| Foamed state | | |
| Immediately after preparation | Good | Surface gas release |
| One hour later | " | Good |
| Four hours later | " | Good (A little hard) |
| One day later | " | Not foamed by scorching |
| Three days later | " | — |
| Seven days later | " | — |

TABLE 3-continued

| | Example 7 | Comparative Example 5 |
|---|---|---|
| later | | |

*Platinum compound: Platinum chloride acid 2-ethylhexanol solution containing 2% of platinum
**Cross-linking agent: Dimethylpolysiloxane with a polymerization degree of 150 containing 50 mol % of methylhydrogensiloxane unit
***Foaming agent: Azobisisobutyronitrile From the results in Table 3, it is recognized that the composition of the present invention has a long pot life and can be used for seven days from immediately after preparation without any problem. On the other hand, the addition reaction type composition of the Comparative Example 5 is used only for 4 hours.

As described above, the non-foamable and foamable conductive silicone rubber compositions according to the present invention can effectively employ normal-pressure hot-air vulcanization using an organic peroxide although the compositions are blended with carbon black. The resulting non-foamed and foamed conductive silicone rubbers can preferably be used for many purposes because they are free from surface tack and superior in heat resistance and conductivity. The foamable compositions of the present invention have excellent preservation stability and log pot life.

We claim:

1. A cured conductive silicone rubber which is produced by subjecting a conductive silicone rubber composition to a normal-pressure hot-air vulcanization method, wherein said conductive silicone rubber composition comprises:

(a) an organopolysiloxane of the following general formula (1):

$$R_a^1 SiO_{(4-a)/2}$$

wherein $R^1$ is an unsubstituted or substituted monovalent hydrocarbon group having 1 to 10 carbon atoms and "a" is a positive number of 1.90 to 2.05, (b) conductive carbon black, and (c) an organic peroxide of the following general formula $$R^2-OO-\underset{O}{\underset{\|}{C}}-O-X-O-\underset{O}{\underset{\|}{C}}-OO-R^3 \quad (2)$$

wherein X is $-(CH_2)_n-$ in which "n" is an integer of 2 to 8 or $$-CH_2-\underset{\underset{CH_3}{|}}{\overset{\overset{CH_3}{|}}{C}}-CH_2-,$$

and $R^2$ and $R^3$ are independently selected from monovalent hydrocarbon groups having 3 to 10 carbon atoms and $-SiR_3^4$ in which $R^4$ is a methyl, ethyl or phenyl group, wherein said composition is capable of being fully cured by normal-pressure, hot-air vulcanization.

2. The cured conductive silicone rubber according to claim 1, wherein said conductive silicone rubber composition further comprises (d) a foaming agent.

* * * * *